(12) United States Patent
Delling et al.

(10) Patent No.: US 9,612,128 B2
(45) Date of Patent: Apr. 4, 2017

(54) CONTROLLING TRAVEL ROUTE PLANNING MODULE BASED UPON USER TRAVEL PREFERENCE

(71) Applicant: Microsoft Technology Licensing, LLC, Redmond, WA (US)

(72) Inventors: Daniel Delling, Sunnyvale, CA (US); Moises Goldszmidt, Palo Alto, CA (US); Andrew V. Goldberg, Emerald Hills, CA (US); John Krumm, Redmond, WA (US); Renato Fonseca Furquim Werneck, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/699,429

(22) Filed: Apr. 29, 2015

(65) Prior Publication Data

US 2016/0320200 A1    Nov. 3, 2016

(51) Int. Cl.
 *G01C 21/36* (2006.01)
 *G01S 19/42* (2010.01)
(52) U.S. Cl.
 CPC .......... *G01C 21/3605* (2013.01); *G01S 19/42* (2013.01)
(58) Field of Classification Search
 CPC .............................. G01C 19/42; G01C 21/36
 USPC ................... 701/425, 414; 340/905
 See application file for complete search history.

(56) References Cited

U.S. PATENT DOCUMENTS

| | | | |
|---|---|---|---|
| 6,212,473 | B1 | 4/2001 | Stefan et al. |
| 7,289,904 | B2 | 10/2007 | Uyeki |
| 7,512,487 | B1 | 3/2009 | Golding et al. |
| 7,610,151 | B2 | 10/2009 | Letchner et al. |

(Continued)

FOREIGN PATENT DOCUMENTS

WO    2011059421 A1    5/2011

OTHER PUBLICATIONS

Yuan, et al., "T-Drive: Enhancing Driving Directions with Taxi Drivers' Intelligence", In Proceedings of the IEEE Transactions on Knowledge and Data Engineering, vol. 25, Issue: 1, Jan. 2013, 14 pages. http://research.microsoft.com/pubs/153688/tdrive_tkde.pdf.

(Continued)

*Primary Examiner* — Tan Q Nguyen
(74) *Attorney, Agent, or Firm* — Rainier Patents, P.S.

(57) ABSTRACT

One or more techniques and/or systems are provided for controlling a travel route planning module associated with a user device. Travel related data, for a user and regarding previously traveled routes by the user, may be indicative of user travel preferences and/or behaviors. The travel related data is evaluated against computed routes derived from different weighting values applied to travel metrics (e.g., a cost associated with a U-turn, a highway, an industrial zone, etc.). For example, weighting values may be iteratively adjusted to generate a plurality of modified computed routes that may be evaluated to identify a target computed route having a similarity to a previously traveled route of the user above a threshold. User preference weighted travel metrics, generated based upon weighted travel metrics of the target computed route, are used to control a travel route planning module to generate a customized travel route for the user.

20 Claims, 8 Drawing Sheets

(56) References Cited

U.S. PATENT DOCUMENTS

| | | | |
|---|---|---|---|
| 7,680,749 | B1 | 3/2010 | Golding et al. |
| 7,912,637 | B2 | 3/2011 | Horvitz et al. |
| 7,948,400 | B2 | 5/2011 | Horvitz et al. |
| 7,984,006 | B2 | 7/2011 | Price |
| 7,996,345 | B2 | 8/2011 | Golding et al. |
| 8,024,111 | B1* | 9/2011 | Meadows .......... G01C 21/3492 340/905 |
| 8,024,112 | B2 | 9/2011 | Krumm et al. |
| 8,090,530 | B2 | 1/2012 | Horvitz |
| 8,428,859 | B2 | 4/2013 | Seltzer et al. |
| 8,467,961 | B2 | 6/2013 | Obradovich et al. |
| 8,682,574 | B2 | 3/2014 | Golding et al. |
| 8,718,925 | B2 | 5/2014 | Letchner et al. |
| 8,793,066 | B2 | 7/2014 | Panabaker et al. |
| 2002/0128773 | A1 | 9/2002 | Chowanic et al. |
| 2005/0102098 | A1 | 5/2005 | Montealegre et al. |
| 2009/0210142 | A1 | 8/2009 | Couckuyt et al. |
| 2009/0210242 | A1 | 8/2009 | Black et al. |
| 2009/0210302 | A1 | 8/2009 | Tashev et al. |
| 2010/0228574 | A1* | 9/2010 | Mundinger .......... G06Q 10/047 705/4 |
| 2010/0332131 | A1* | 12/2010 | Horvitz .............. G01C 21/3697 701/414 |
| 2013/0006521 | A1 | 1/2013 | Needham et al. |
| 2013/0261956 | A1* | 10/2013 | Marks ................ G01C 21/3423 701/425 |
| 2014/0143184 | A1 | 5/2014 | Koukoumidis et al. |

OTHER PUBLICATIONS

Zheng, et al., "Learning Travel Recommendations from User-Generated GPS Traces", In Proceedings of the ACM Transactions on Intelligent Systems and Technology, Jan. 2011, 29 pages. http://research.microsoft.com/pubs/131039/p1-zheng.pdf.

Ceikute, Vaida, "Inferring Groups of Objects, Preferred Routes, and Facility Locations from Trajectories", In Dissertation of Aarhus University, Sep. 26, 2013, 141 pages. http://pure.au.dk//portal/files/68736550/Ph.D_dissertation_Vaida_Ceikute.pdf.

Abraham, et al., "Hierarchical Hub Labelings for Shortest Paths", In Proceedings of the 20th Annual European conference on Algorithms, Sep. 10, 2012, 12 pages. http://i11www.iti.uni-karlsruhe.de/extra/publications/adgw-hhlsp-12.pdf.

Abraham, et al., "Alternative Routes in Road Networks", In Proceedings of the ACM Journal of Experimental Algorithmics, vol. 18, No. 1, Apr. 2013, 17 pages. http://delivery.acm.org/10.1145/2450000/2444019/a1_3-abraham.pdf?ip=203.8.109.15&id=2444019&acc=ACTIVE%20SERVICE&key=55B4AB8801AAB282%2E55B4AB8801AAB282%2E4D4702B0C3E38B35%2E4D4702B0C3E38B35&CFID=543759433&CFTOKEN=36445562&_acm_=1408940000_795f6f5e944dd07663ef.

Agrawala, et al., "Rendering Effective Route Maps: Improving Usability Through Generalization", In Proceedings of the 28th annual conference on Computer graphics and interactive techniques, Aug. 12, 2001, 10 pages. http://dl./acm.org/citation.cfm?id=383286.

Auslender, A., "Optimisation Metodes Numeriques", In Proceedings of Masson, Jan. 1, 1976, 2 pages. http://www.amazon.com/Optimisation-numeriques-mathematiques-applications-fondamentales/dp/2225429006.

Bast, et al., "Route Planning in Transportaion Networks", In Proceedings of the Technical Report, MSR-TR-2014-4, Jan. 8, 2014, 57 pages. http://research.microsoft.com/pubs/207102/MSR-TR-2014-4.pdf.

Bast, et al., "Fast Routing in Road Networks with Transit Nodes", In Proceedings of Science, vol. 316, No. 5824, Apr. 27, 2007, 1 page. http://people.mpi-inf.mpg.de/~funke/Papers/SCIENCE07/SCIENCE07.pdf.

Bertsekas, Dimitri P., "Nonlinear Programming", In Proceedings of Massachusetts, second edition, Sep. 1, 1999, 372 pages. https://www.eejitb.acin/course/~rachel/Bertsekas_Nonlinear_Programming.pdf.

Biagioni, et al., "Map Inference in the Face of Noise and Disparity", In Proceedings of the 20th International Conference on Advances in Geographic Information Systems, Nov. 6, 2012, 10 pages. http://dl.acm.org/citation.cfm?id=2424333.

Brakatsoulas, et al., "On Map-Matching Vehicle Tracking Data", In Proceedings of the 31st international conference on Very large data bases, Aug. 30, 2005, 12 pages. http://dl.acm.org/citation.cfm?id=1083691.

Chang, et al., "Discovering Personalized Routes from Trajectories", In Proceedings of the 3rd ACM SIGSPATIAL International Workshop on Location-Based Social Networks, Nov. 1, 2011, 8 pages. http://dl.acm.org/citation.cfm?id=2063218.

Cohn, Nick, "Real-Time Traffic Information and Navigation", In Proceedings of the Transportation Research Record: Journal of the Transportation Research Board, vol. 2129, Jan. 7, 2010, 2 pages. http://trb.metapress.com/content/070g217078j26686/.

Silva, et al., "Personalized Path Finding in Road Networks", In Proceedings of the Fourth International Conference on Networked Computing and Advanced Information Management, vol. 2, Sep. 2, 2008, 6 pages. http://ieeexplore.ieee.org/stamp/stamp.jsp?tp=&arnumber=4624209.

Delling, et al., "Customizable Route Planning", In Proceedings of the 10th international conference on Experimental algorithms, May 5, 2011, 12 pages. http://research.microsoft.com/pubs/145688/crp-sea.pdf.

Delling, et al., "Customizable Route Planning in Road Networks", In Proceedings of the Sixth International Symposium on Combinatorial Search, Jul. 24, 2013, 31 pages. http://research.microsoft.com/pubs/198358/crp_web_130724.pdf.

Delling, et al., "Customizing Driving Directions with GPUs", In Proceedings of the 20th International Conference on Parallel Processing, Aug. 25, 2014, 12 pages. http://research.microsoft.com/pubs/219453/gCRP_EuroPar2014.pdf.

Delling, et al., "Faster Customization of Road Networks", In Proceedings of the 12th International Symposium on Experimental Algorithms, Jun. 5, 2013, 12 pages. http://research.microsoft.com/pubs/198354/crp-micro.pdf.

Dijkstra, E. W., "A Note on Two Problems in Connexion with Graphs", In Proceedings of Numerische Mathematik, vol. 1, Issue 1, Dec. 1, 1959, 3 pages. http://math.mit.edu/~asuk/terence.pdf.

Dimond, et al., "Improving Route Prediction through User Journey Detection", In Proceedings of the 21st ACM SIGSPATIAL International Conference on Advances in Geographic Information Systems, Nov. 5, 2013, 4 pages. http://dl.acm.org/citation.cfm?id=2525464.

Douglas, et al., "Algorithms for the Reduction of the Number of Points Required to Represent a Digitized Line or its Caricature", In Proceedings of Cartographica: The International Journal for Geographic Information and Geovisualization, vol. 10, Issue 2, Dec. 1973, 2 pages. http://utpjournals.metapress.com/content/fm576770u75u7727/.

Duckham, et al., "Simplest Paths: Automated Route Selection for Navigation", In International Conference on Spatial Information Theory, Foundations of Geographic Information Science, vol. 2825, Sep. 24, 2003, 18 pages. http://ww2.cs.mu.oz.au/~lars/Publications/Cosit2003DK.pdf.

Funke, et al., "Polynomial-time Construction of Contraction Hierarchies for Multi-criteria Objectives", In Proceedings of the 15th Meeting on Algorithm Engineering and Experiments, Jan. 7, 2013, 14 pages. http://ad-publications.informatik.uni-freiburg.de/ALENEX_multiCH_FS_2013.pdf.

Geisberger, et al., "Route Planning with Flexible Edge Restrictions", In Proceedings of ACM Journal of Experimental Algorithmics, vol. 17, No. 1, Mar. 2012, 20 pages. http://dl.acm.org/citation.cfm?id=2133805.

Haklay, et al., "Openstreetmap: User-Generated Street Maps", In Proceedings of IEEE Pervasive Computing, vol. 7 , Issue: 4, Oct. 2008, 7 pages. http://ieeexplore.ieee.org/stamp/stamp.jsp?tp=&arnumber=4653466.

Krumm, et al., "Placer: Semantic Place Labels from Diary Data", In Proceedings of the ACM international joint conference on Pervasive and ubiquitous computing, Sep. 8, 2013, 9 pages. http://dl.acm.org/citation.cfm? id=2493504.

(56) References Cited

OTHER PUBLICATIONS

Letchner, et al., "Trip Router with Individualized Preferences (trip): Incorporating Personalization into Route Planning", In Proceedings of the Twenty-First National Conference on Artificial Intelligence and the Eighteenth Innovative Applications of Artificial Intelligence Conference, Jul. 16, 2006, 6 pages. http://research.microsoft.com/en-us/um/people/horvitz/personalized_routing.pdf.
Mazumder, et al., "SparseNet: Coordinate Descent with Nonconvex Penalties", In Journal of the American Statistical Association, vol. 106, No. 495, Sep. 2011, 24 pages. http://statweb.stanford.edu/~rahulm/jasa_MFH_combined.pdf.
Newson, et al., "Hidden Markov Map Matching through Noise and Sparseness", In Proceedings of the 17th ACM SIGSPATIAL International Conference on Advances in Geographic Information Systems, Nov. 4, 2009, 8 pages. http://dl.acm.org/citation.cfm?id=1653818.
Rogers, et al., "Mining GPS Data to Augment Road Models", In Proceedings of the fifth ACM SIGKDD international conference on Knowledge discovery and data mining, Aug. 1, 1999. http://dl.acm.org/citation.cfm?id=312208.
Schapire, Robert E., "The strength of Weak Learnability", In Journal of Machine Learning, vol. 5 Issue 2, Jun. 1990, 31 pages. https://www.cs.princeton.edu/~schapire/papers/strengthofweak.pdf.
Sommer, Christian, "Shortest-Path Queries in Static Networks", In Journal of ACM Computing Surveys, vol. 46 Issue 4, Mar. 2014, 31 pages. http://dl.acm.org/citation.cfm?id=2530531.
Yuan, et al., "T-drive: Driving Directions based on Taxi Trajectories", In Proceedings of the 18th SIGSPATIAL International Conference on Advances in Geographic Information Systems, Nov. 2, 2010, 10 pages. http://dl.acm.org/citation.cfm?id=1869807.
Ziebart, et al., "Navigate like a Cabbie: Probabilistic Reasoning from Observed Context-Aware Behavior", In Proceedings of the 10th international conference on Ubiquitous computing, Sep. 21, 2008, 10 pages. http://dl.acm.org/citation.cfm?id=1409678.
Bader et al., "Alternative Route Graphs in Road Networks," Proceedings of the 1st International ICST Conference on Theory and Practice of Algorithms in (Computer) Systems (TAPAS'11), vol. 6595 of Lecture Notes in Computer Science, Springer, 2011, 22 pages.
Delling et al., "Navigation Made Personal: Inferring Driving Preferences from GPS Traces," SIGSPATIAL '15, Nov. 3-6, 2015, Bellevue, WA, 9 pages.
Kobitzsch, Moritz, "HiDAR: An Alternative Approach to Alternative Routes," Proceedings of the 21st Annual European Symposium on Algorithms (ESA'13), vol. 8125 of Lecture Notes in Computer Science, pp. 613-624. Springer, 2013, 12 pages.
Non-Final Office Action mailed Sep. 3, 2009 from U.S. Appl. No. 11/426,540, 8 pages.
Response filed Nov. 24, 2009 to the Non-Final Office Action mailed Sep. 3, 2009 from U.S. Appl. No. 11/426,540, 9 pages.
Non-Final Office Action mailed Apr. 6, 2010 from U.S. Appl. No. 11/426,540, 11 pages.
Response filed Jul. 6, 2010 to the Non-Final Office Action mailed Apr. 6, 2010 from U.S. Appl. No. 11/426,540, 11 pages.
Non-Final Office Action mailed Oct. 14, 2010 from U.S Appl. No. 11/426,540, 36 pages.
Response filed Jan. 25, 2011 to the Non-Final Office Action mailed Oct. 14, 2010 from U.S. Appl. No. 11/426,540, 12 pages.
Notice of Allowance mailed Apr. 15, 2011 from U.S. Appl. No. 11/426,540, 11 pages.
Non-Final Office Action mailed Feb. 2, 2010 from U.S. Appl. No. 11/771,205, 37 pages.
Response filed May 3, 2010 to the Non-Final Office Action mailed Feb. 2, 2010 from U.S Appl. No. 11/771,205, 12 pages.
Final Office Action mailed May 24, 2010 from U.S. Appl. No. 11/771,205, 18 pages.
Response filed Aug. 24, 2010 to the Final Office Action mailed May 24, 2010 from U.S. Appl. No. 11/771,205, 10 pages.
Non-Final Office Action mailed Sep. 15, 2010 from U.S. Appl. No. 11/771,205, 17 pages.
Response filed Dec. 15, 2010 to the Non-Final Office Action mailed Sep. 15, 2010 from U.S. Appl. No. 11/771,205, 11 pages.
Notice of Allowance mailed Jan. 14, 2011 from U.S. Appl. No. 11/771,205, 10 pages.
Non-Final Office Action mailed Mar. 5, 2009 from U.S. Appl. No. 11/767,921, 25 pages.
Response filed Aug. 5, 2009 to the Non-Final Office Action mailed Mar. 5, 2009 from U.S. Appl. No. 11/767,921, 10 pages.
Final Office Action mailed Nov. 10, 2009 from U.S. Appl. No. 11/767,921, 14 pages.
Response filed Feb. 10, 2010 to the Final Office Action mailed Nov. 10, 2009 from U.S. Appl. No. 11/767,921, 11 pages.
Non-Final Office Action mailed Jul. 8, 2010 from U.S. Appl. No. 11/767,921, 16 pages.
Response filed Oct. 1, 2010 to the Non-Final Office Action mailed Jul. 8, 2010 from U.S. Appl. No. 11/767,921, 11 pages.
Notice of Allowance mailed Nov. 24, 2010 from U.S. Appl. No. 11/767,921, 4 pages.
U.S. Appl. No. 60/721,879 titled "Predestination," filed Sep. 29, 2005 by inventors Eric J. Horvitz and John C. Krumm, 31 pages.

\* cited by examiner

CONTROLLING TRAVEL ROUTE PLANNING MODULE BASED UPON USER TRAVEL PREFERENCE

BACKGROUND

Many computing devices and/or applications may provide map functionality, such as a map website, a vehicle navigation system, a running application on a mobile device, etc. For example, a route planning application may provide users with travel routes from starting locations to destination locations.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for controlling a travel route planning module associated with a user device are provided herein. In an example, travel related data, for a user and regarding a traveled route traveled by the user from a starting location to a destination location, is accessed. The travel related data comprises travel metrics for the traveled route. A set of weighting values is applied to the travel metrics to generate a computed route having weighted travel metrics. In an example, a plurality of weighting value modifications are applied to a plurality of weighting values within the set of weighting values to generate a modified set of weighting values. The modified set of weighting values is applied to the travel metrics to generate a modified computed route having modified weighted travel metrics. User preference weighted travel metrics are generated using the modified weighted travel metrics based upon first similarity information between the computed route and the traveled route being less than second similarity information between the modified computed route and the traveled route. Otherwise, the user preference weighted travel metrics are generated using the weighted travel metrics. A travel route planning module, associated with a user device of the user, is controlled to generate a travel route utilizing the user preference weighted travel metrics.

In another example, travel related data, for a user and regarding one or more traveled routes traveled by the user, is accessed. For respective traveled routes of the one or more traveled routes, a traveled route from a starting location to a destination location is identified. The travel related data comprises travel metrics for the traveled route. Weighting values, within a set of weighting values, are iteratively adjusted to generate a plurality of modified computed routes having different modified weighted travel metrics. The modified computed routes of the plurality are evaluated against the traveled route to identify a target computed route having a similarity with the traveled route above a threshold. User preference weighted travel metrics are maintained based upon target weighted travel metrics associated with the target computed route. A travel route planning module, associated with a user device of the user, is controlled to generate a travel route utilizing the user preference weighted travel metrics.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
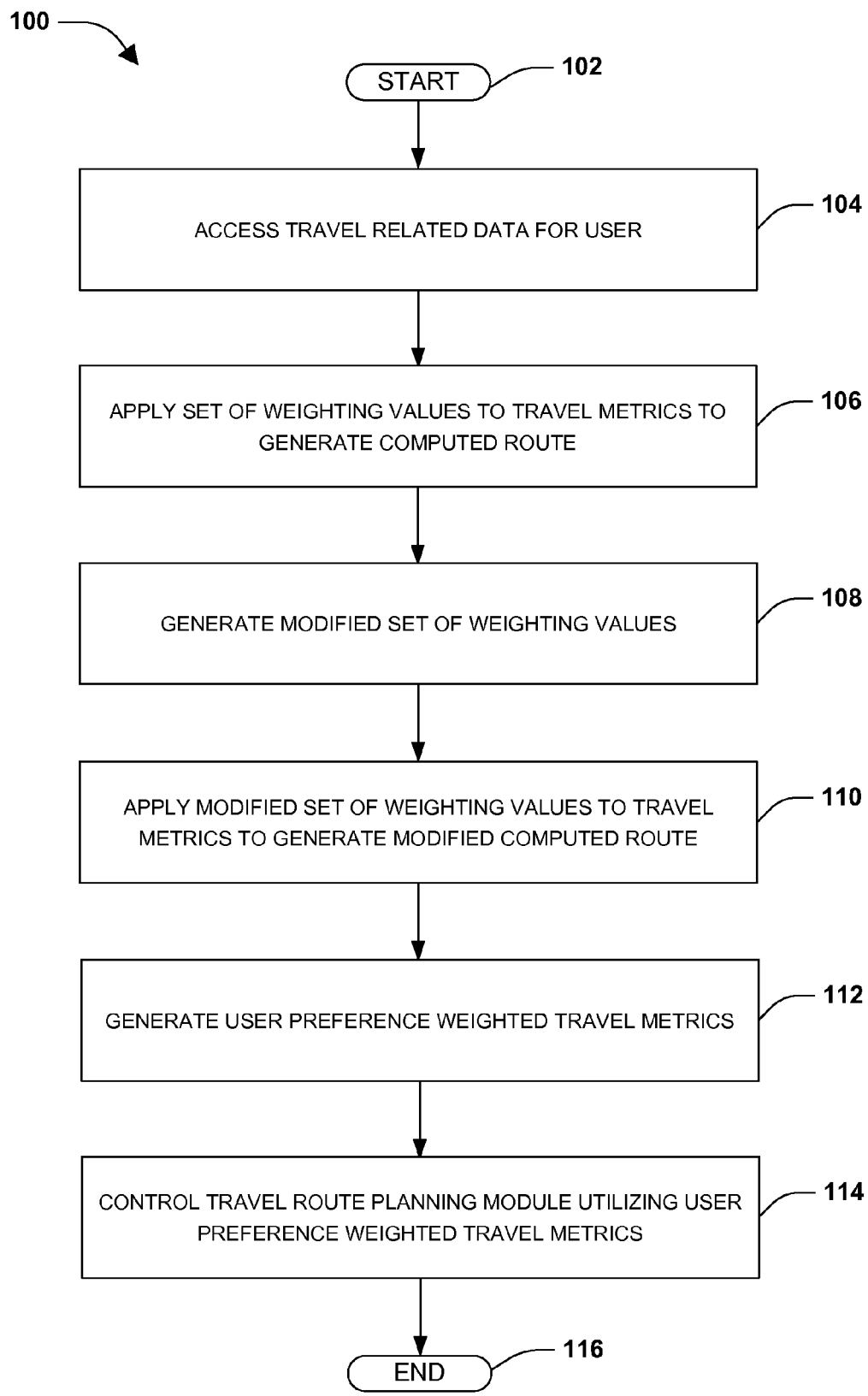
FIG. 1 is a flow diagram illustrating an exemplary method of controlling a travel route planning module associated with a user device.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques for controlling a travel route planning module associated with a user device are provided herein. Many users may utilize travel route planning modules to plan travel routes from starting locations to destination locations (e.g., a map application on a mobile device, a mapping website, a vehicle navigation system, etc.). Unfortunately, travel route planning modules may merely provide users with travel routes created by a single one-size-fits-all predefined template of weighted costs used to select segments for travel route creation, and offer little to no customization (e.g., a user may have to explicitly specify a preference for avoiding highways and toll roads). Thus, the user may disregard a suggested travel route and/or attempt to re-execute a travel route planning module in order to obtain a more desirable travel route (e.g., the user may perform additional searches, such as through the travel route planning module and/or additional travel route planning modules/services, for new suggested travel routes that may better match implicit preferences of the user).

Accordingly, as provided herein, the travel route planning module may be controlled to generate a travel route based upon user preference weighted travel metrics. The user preference weighted travel metrics may correspond to implied user preferences that are derived from (e.g., many) previously traveled routes by the user (e.g., the user may travel routes that are indicative of the user implicitly assigning certain costs to U-turns, left turns, industrial zones, etc. (e.g., as evidenced by the user's propensity to avoid routes or segments of routes having such features)). The user may be identified, for example, such as for the purposes of obtaining implied user preferences (e.g., for obtaining vehicle telemetry data, driving route data, and/or locational data such as global positioning data, etc.), based upon voice recognition, the user being logged into a computing device (e.g., the user logging into a vehicle navigation system of a vehicle and/or a route planning application of a mobile device, etc.), a device identification of a mobile device of the user (e.g., a mobile phone of the user may connect to a vehicle computing device of a vehicle), and/or a variety of other user and/or device identification techniques. In this way, the travel route planning module may be controlled to provide travel routes that may be personalized and therefore desirable to the user so that the user does not disregard suggested travel routes and/or re-execute the travel route planning module or seek out additional travel route planning modules/services in search of obtaining additional suggested travel routes that may potentially satisfy the user's implied travel preferences. By providing travel routes that may be personalized and/or desirable to the user, processing resources and/or bandwidth utilization may be conserved because the user may execute fewer route planning requests to obtain a desirable route from a starting location to a destination location. In an example, at least some of a user preference weight generator and/or a travel route coordinator, configured to control a travel route planning module, may be hosted on a user device (e.g., a mobile phone, a vehicle navigation system, etc.) for improved privacy of user data and/or may be hosted on a device remote from the user device (e.g., a cloud based mapping service configured to push travel routes to the user device) to offload processing from a local device (e.g., to a more capable, powerful, etc. server). A user may take affirmative action, such as providing opt-in consent, to allow access to and/or use of travel related data (e.g., GPS traces), such as for the purpose of generating user preference weighted travel metrics (e.g., where the user responds to a prompt regarding the collection and/or use of such data/information).

An embodiment of controlling a travel route planning module associated with a user device is illustrated by an exemplary method 100 of FIG. 1. At 102, the method starts. At 104, travel related data, for a user and regarding a traveled route traveled by the user from a starting location to a destination location, may be accessed (e.g., the user may have traveled a scenic route, in an attempt to avoid a highway and industrial zone, from a vacation hotel to a restaurant). For example, a travel route data storage structure (e.g., populated with the travel related data from a GPS sensor) may be accessed to obtain the travel related data (e.g., a GPS sensor of a user device, such as a mobile device or a vehicle navigation system, may store GPS trace data within a GPS storage file on the user device and/or within a GPS cloud storage location). The travel related data comprises travel metrics for the traveled route.

At 106, a set of weighting values may be applied to the travel metrics to generate a computed route having weighted travel metrics. A travel metric may, for example, refer to an intrinsic characteristic of a route and/or a segment of a route, and a weighting value may, for example, correspond to a cost attributed to a particular travel metric (e.g., a cost of 4.2 attributed to a (e.g., relatively slow moving) industrial zone along a segment of the route, a cost of 3.4 attributed to a left hand turn along a segment of the route, etc.). Prior to being customized for a user, weighting values may be determined in any number of ways. For example, an initial or default weighting value (e.g., of 1.0) may simply be assigned to different travel metrics. Alternatively, a weighting value may be based on observations of aggregate driving behavior of many users so as to be reflective of unbiased costs for travel metrics. For example, a default weighting value of 30 seconds may be attributed to a left hand turn based upon the behavior of many users/drivers. As provided herein, the weighting value of 30 seconds may ultimately be increased or decreased for a particular user based upon behavior of the user, for example. The 30 seconds may be increased to 60 seconds, for example, responsive to the user historically avoiding left hand turns (e.g., the weighting value may thus be indicative of the particular user regarding left hand turns as being twice as costly as compared to other users). Alternatively, the 30 seconds may be decreased to 15 seconds, for example, responsive to the user historically not avoiding left hand turns (e.g., the weighting value may thus be indicative of the particular user regarding left hand turns as being one-half as costly as compared to other users).

In an example, a user specified travel metric (e.g., a travel metric corresponding to a lack of a public restroom within a 25 mile radius) may be accessed and included within the travel metrics. The user specified travel metric may have an associated weighting value indicative of the user's affinity for the particular metric. The weighting values of the set of weighing values are generally derived from multiple historical routes of the user so as to be reflective of the user's general propensity to avoid (or not) certain travel metrics. For example, a user may occasionally make a left hand turn, but generally tends to avoid left hand turns (e.g., particularly in high traffic/congestion areas) and/or may occasionally travel along highways, but generally opts for scenic routes (e.g., particularly on weekends). Additionally, using multiple historical routes of the user provides data for various road types, travel situations, etc. that may otherwise not be available from a single or merely a few routes traveled by the user. In an example, the computed route may be derived from weighted travel metrics of other users that may be similar to the user (e.g., similar in age, location, travel habits, vehicle type, etc.). For example, a second user may be identified based upon the second user having a second user profile that is similar to a user profile of the user (e.g., a social network profile, a mapping service profile, and/or other information indicative of a user attributes). Second user preference weighted travel metrics, associated with the second user, may be accessed (e.g., the second user may provide consent for use of the second user preference weighted travel metrics). The second user preference weighted travel metrics may be utilized as seed data for generating the weighted travel metrics of the computed route.

At 108, a modified set of weighting values may be generated by applying a plurality of weighting value modifications (e.g., in parallel) to a plurality of weighting values within the set of weighting values. In an example, weighting values, within the set of weighting values, may be iteratively adjusted to generate one or more modified computed routes having different modified weighted travel metrics. The computed route and the one or more modified computed routes may be evaluated against the traveled route (e.g., and/or other traveled routes traveled by the user) in order to determine a target computed route (e.g., that corresponds to the traveled route above a threshold (e.g., the target computed route may be more similar to the traveled route than other computed routes)). Thus, weighting values of the target computed route may reflect user travel preferences and/or behaviors (e.g., a strong propensity to avoid construction zones).

In an example of an iteration of modifying weighting values, the modified set of weighting values may be applied to the travel metrics to generate a modified computed route having modified weighted travel metrics, at 110. In an example, the modified set of weighting values may be generated based upon a weighting value increase or weighting value decrease applied to a weighing value within the set of weighting values used to generate the computed route. In an example, the modified set of weighting values may be generated based upon a plurality of weighting value modifications applied in parallel to a plurality of weighting values within the set of weighting values used to generate the computed route. In this way, the modified weighted travel metrics may be created and used to generate the modified computed route.

Similarity information between the computed route and the traveled route and between the modified computed route and the traveled route may be generated. Similarity information may, for example, comprise distance information corresponding to distances between points along the computed route and points along the traveled route. In an example, the computed route may comprise a plurality of computed route points along segments of the computed route from the starting location to the destination location. The traveled route may comprise a plurality of traveled route points along segments of the traveled route from the starting location to the destination location. In an example, a traveled route point may be defined as comprising a point on the traveled route or a polygon area encompassing the point on the traveled route. In an example of generating similarity information, distances between computed route points and travel route points may be evaluated against a threshold distance (e.g., about 100 meters or any other distance) to determine whether or not a computed route point matches a traveled route point (e.g., the similarity information may indicate a degree of similarity between the computed route and the traveled route based upon a number of computed route points being within the threshold distance of the travel route points). For example, a computed route point on the computed route may be counted as a match with respect to a traveled routed on the traveled route (e.g., thus increasing a similarity score between the computed route and the traveled route) based upon the computed route point being within a threshold distance of the traveled route point, otherwise, the computed route point is not counted as the match (e.g., thus decreasing or not increasing the similarity score between the computed route and the traveled route). In this way, first similarity information, such as the similarity score between the computed route and the traveled route, and second similarity information, such as a second similarity score between the modified computed route and the traveled route, may be generated.

At 112, user preference weighted travel metrics may be generated using the modified weighted travel metrics of the modified computed route based upon the first similarity information between the computed route and the traveled route being less than the second similarity information between the modified computed route and the traveled route because the modified computed route may be more similar to the traveled route than the computed route is to the traveled route. In this way, the modified set of weighting values, used to generate the modified computed route, may be more indicative of user travel preferences and/or behavior than the set of weighting values used to generate the computed route.

The user preference weighted travel metrics may be generated using the weighted travel metrics of the computed route based upon the first similarity information being greater than the second similarity information because the computed route may be more similar to the traveled route than the modified computed route is to the traveled route. In this way, the set of weighting values, used to generate the computed route, may be more indicative of user travel preferences and/or behavior than the modified set of weighting values used to generate the modified computed route. It may be appreciated that any number of modified computed routes may be generated and compared to the traveled route to identify a target computed route that is more similar to the traveled route than other computed routes are to the traveled route. In an example, a coordinate decent machine learning technique and/or any other machine learning technique may be utilized to evaluate the travel related data and/or computed routes for generating the user preference weighted travel metrics. The user preference weighted travel metrics may comprise weighting values corresponding to costs associated with the travel metrics.

The user preference weighted travel metrics may be utilized to generate travel routes that may be more desirable to the user than if default weighted travel metrics were used because the user preference weighted travel metrics were derived from weighting value used to generate computed routes that were more similar to travel routes already traveled by the user. At 114, a travel route planning module, associated with a user device of the user (e.g., a vehicle computing device, a mobile computing device, etc.), may be controlled to generate a travel route utilizing the user preference weighted travel metrics. For example, the travel route planning module may be controlled to generate a travel route from a new starting location to a new destination location (e.g., a new travel route from a park to a restaurant may be generated).

In an example, updated travel related data associated with the user may be identified (e.g., the user may have recently traveled from home to a baseball stadium). The updated travel related data may be evaluated to determine whether the updated travel related data is indicative of a change in user travel preference of the user (e.g., the user may appear to now favor highway travel). One or more computed routes may be generated for evaluation against the updated travel related data (e.g., to identify weighting values used to generate a target computed route most similar to traveled routes within the updated travel related data) to update the user preference weighted travel metrics.

In an example, a user travel preference of the user may be identified based upon the user preference weighted travel metrics. For example, the user may tend to drive scenic routes. Travel preference feedback may be provided to the user based upon the user travel preference. In an example, a recommendation of scenic driving routes and/or locations may be suggested to the user. In another example, a social network profile, such as a profile of a scenic route driving club, may be suggested to the user. In another example, a scenic travel route may be suggested to the user as an alternate route for traveling between a starting location and a destination location previously traveled between by the user. At 116, the method ends.

Figure 2:
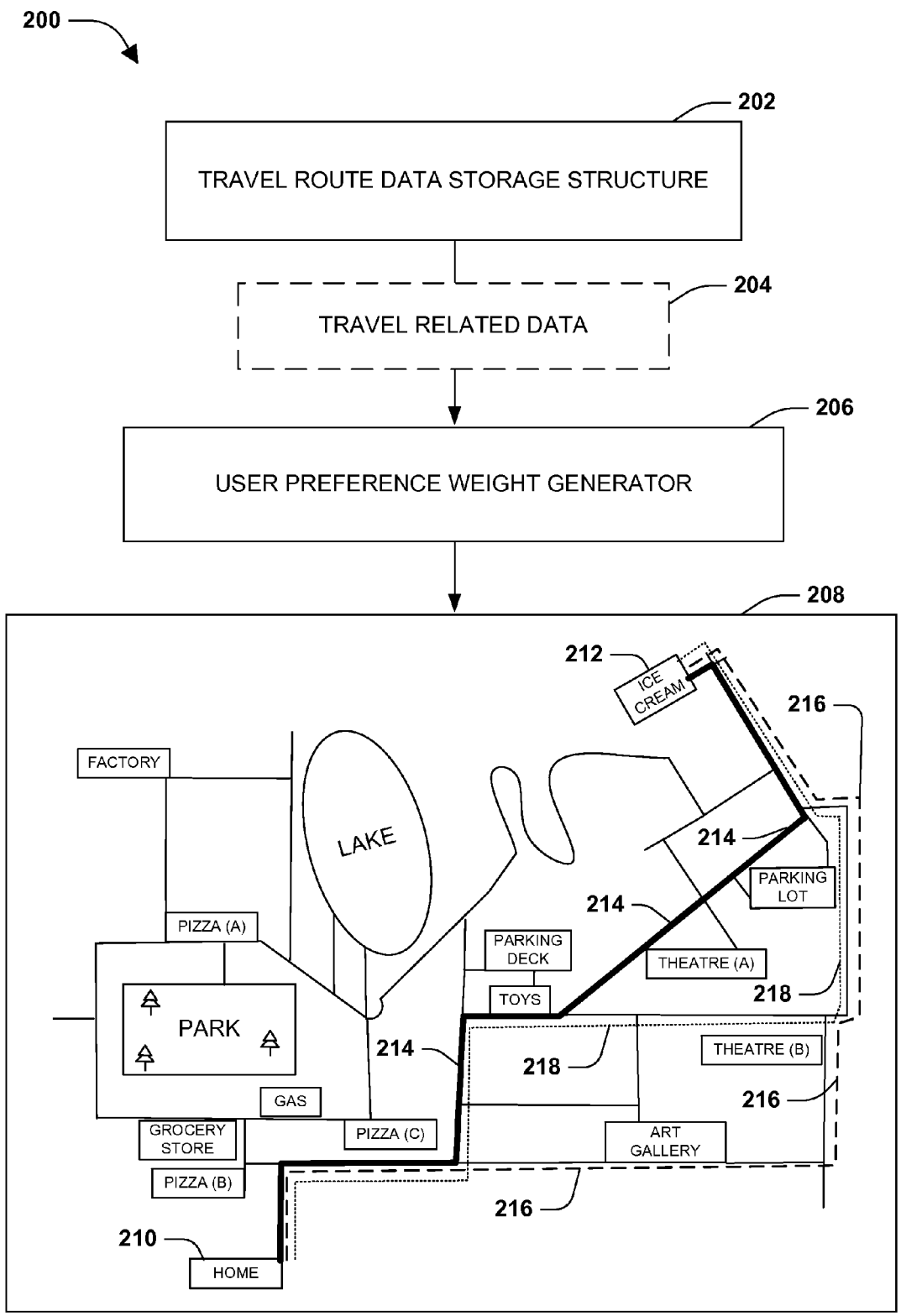
FIG. 2 is a component block diagram illustrating an exemplary system for controlling a travel route planning module associated with a user device, where a computed route and a modified computed route are evaluated against a traveled route.
Figure 6:
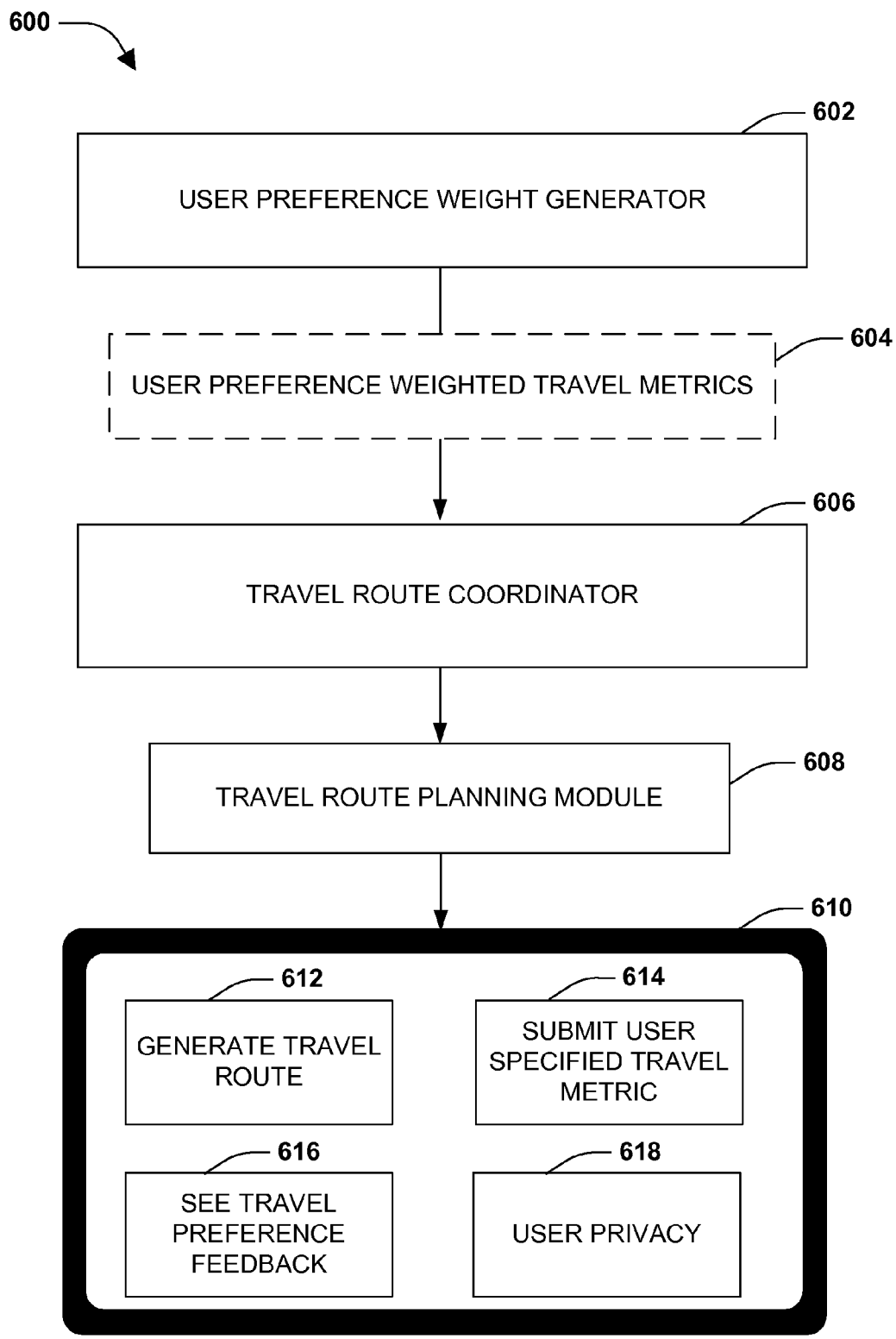
FIG. 6 is a component block diagram illustrating an exemplary system for controlling a travel route planning module associated with a user device.

FIG. 2 illustrates an example of a system 200 for generating user preference weighted travel metrics used to control a travel route planning module associated with a user device (e.g., a travel route planning module 608 of FIG. 6). The system 200 comprises a user preference weight generator 206. The user preference weight generator 206 may be configured to access travel related data 204, comprising travel metrics for a traveled route 214, such as stored within a travel route data storage structure 202 (e.g., GPS trace data from a GPS device). The user preference weight generator 206 may identify the traveled route 214 (e.g., represented by the solid black line) traveled by a user from a home starting location 210 to an ice cream shop destination location 212.

The user preference weight generator 206 may apply a set of weighting values (e.g., a weighting value of 5 for a railroad intersection, a weighting value of 20 for a four way stop, a weighting value of 10 for a left turn; etc.) to the travel metrics to generate a computed route 216 (e.g., represented by a dashed line), from the home starting location 210 to the ice cream shop destination location 212, having weighted travel metrics. The user preference weight generator 206 may modify one or more weighting values to iteratively generate computed routes (e.g., modify the weighting value of 5 for the railroad intersection to a new weighting value of 19), such as a modified computed route 218 (e.g., represented by a dotted line), from the home starting location 210 to the ice cream shop destination location 212. The modified computed route 218 may differ from the computed route 216 because the modified computed route 218 was generated using travel metrics having one or more weighting values that are different than weighting values used to generate the computed route 216. For example, the computed route 216 may comprise a railroad intersection segment near an art gallery. However, the modified computed route 218 may not comprise the railroad interaction segment because of the weighting value increase from 5 to 19 for the railroad intersection. Because the modified computed route 218 may be more similar to the traveled route 214 than the computed route 216, modified weighted travel metrics of the modified computed route 218 (e.g., but not weighted travel metrics of the computed route 216) may be used to generate user preference weighted travel metrics. Once the user preference weighted travel metrics are generated (e.g., during a learning phase), the travel route planning module may be controlled to generate travel routes for the user (e.g., in real-time in response to the user requesting directions from a park to the art gallery) that are more similar to how the user has actually chosen to travel because the user preference weighted travel metrics were derived from the modified weighted travel metrics that produced the modified route 218 that is more similar to the traveled route 214.

Figure 3:
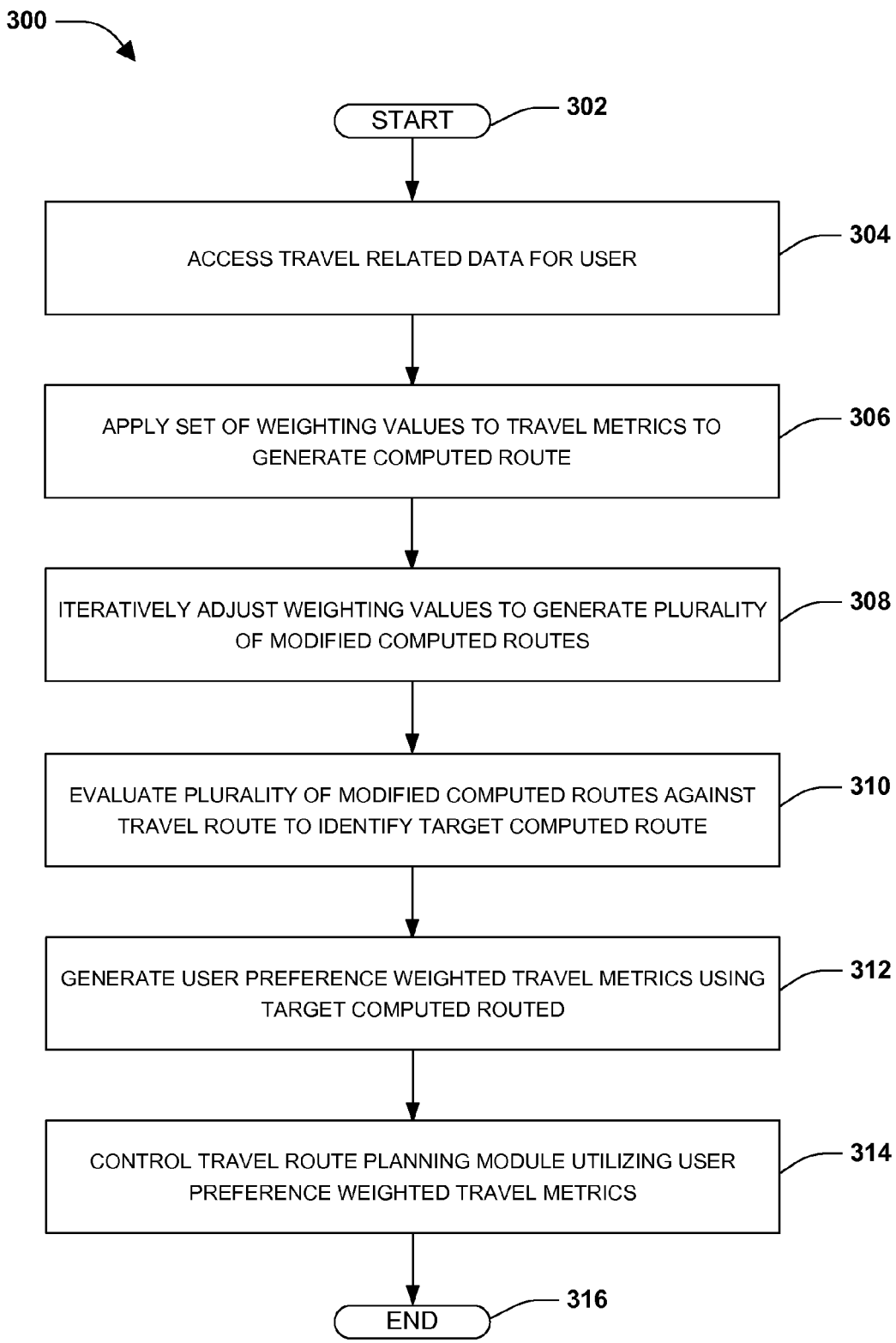
FIG. 3 is a flow diagram illustrating an exemplary method of controlling a travel route planning module associated with a user device.

An embodiment of controlling a travel route planning module associated with a user device is illustrated by an exemplary method 300 of FIG. 3. At 302, the method starts. At 304, travel related data, for a user and regarding a traveled route traveled by the user from a starting location to a destination location, may be accessed. The travel related data may comprise travel metrics for the traveled route. At 306, a set of weighting values may be applied to the travel metrics to generate a computed route having weighted travel metrics (e.g., a weighting value of 4.2 applied to a time travel metric of a first segment of the route, a weighting value of 2.3 applied to a U turn travel metric of a second segment of the route, a weighting value of 5.6 applied to a number of lanes travel metric of a third segment of the route, etc., where the first, second, and/or third segments may be the same and/or different segments). At 308, the weighting values, within the set of weighting values, may be iteratively adjusted (e.g., modification of a single weighting value per iteration or modification of multiple weighting values (e.g., in parallel) per iteration) to generate a plurality of modified computed routes having different modified weighted travel metrics. The plurality of modified computed routes may comprise one or more computed routes that are different from one another because different weighting values were applied to travel metrics for generation of the plurality of modified computed routes (e.g., a first modified computed route may include a highway based upon a low cost for a highway travel metric whereas a second modified computed route may exclude the highway based upon a high cost for a highway travel metric).

At 310, the plurality of modified computed routes may be evaluated against the travel route to identify a target computed route having a similarity with the traveled route above a threshold (e.g., the target computed route may comprise a modified computed route that is most similar to the traveled route). At 312, user preference weighted travel metrics may be generated based upon target weighted travel metrics associated with the target computed route (e.g., weighting values, such as costs applied to travel metrics, used to generate the target computed route). At 314, a travel route planning module, associated with a user device of the user, may be controlled to generate a travel route utilizing the user preference weighted travel metrics. At 316, the method ends.

Figure 4:
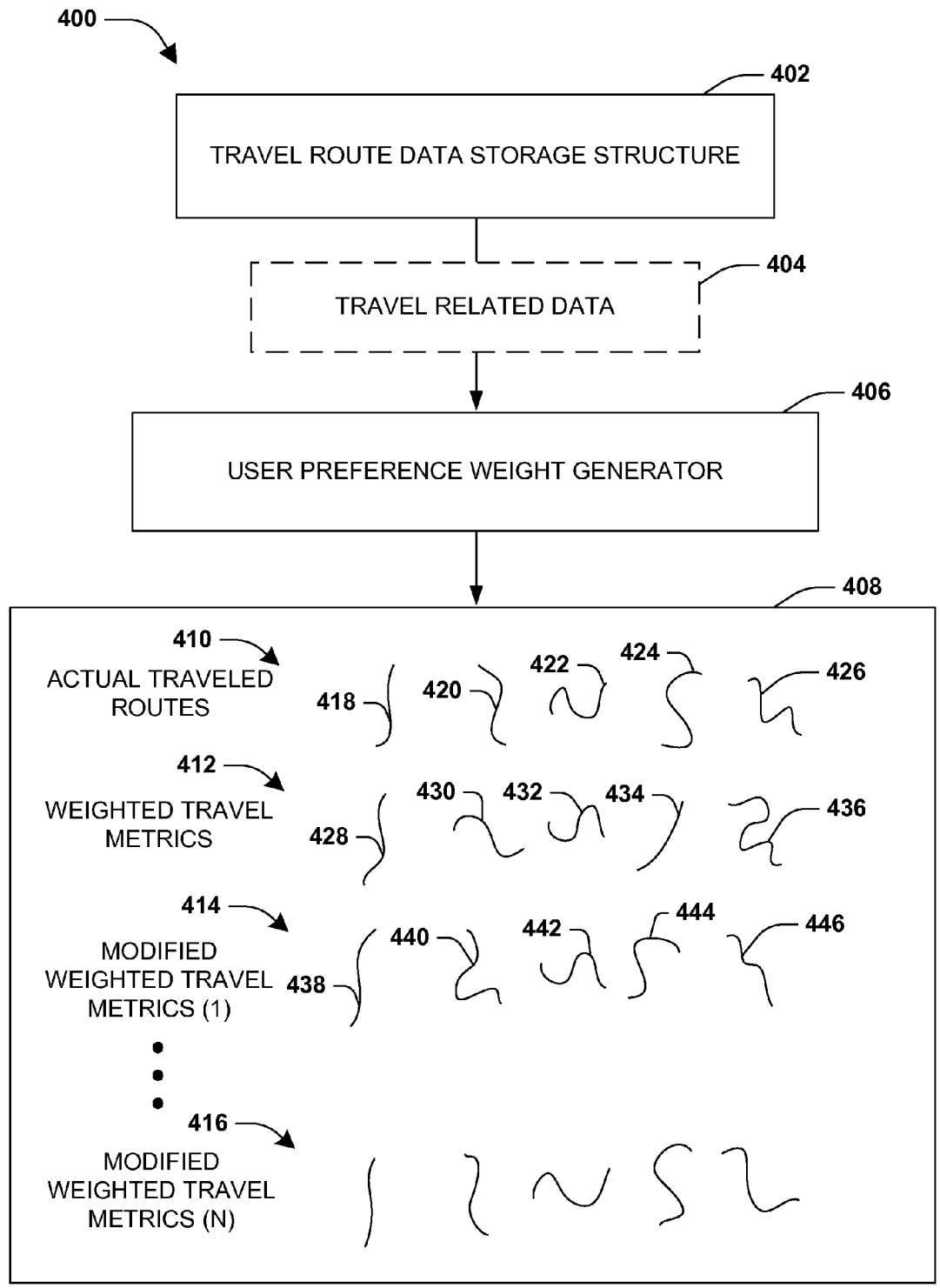
FIG. 4 is a component block diagram illustrating an exemplary system for controlling a travel route planning module associated with a user device, where weighting values are iteratively adjusted to generate a plurality of modified computed routes.

FIG. 4 illustrates an example of a system 400 for generating user preference weighted travel metrics used to control a travel route planning module associated with a user device (e.g., a travel route planning module 608 of FIG. 6). The system 400 comprises a user preference weight generator 406. The user preference weight generator 406 may be configured to access travel related data 404, such as stored within a travel route data storage structure 402 (e.g., GPS trace data from a GPS device). The user preference weight generator 406 may identify a set of actual traveled routes 410, such as a first route 418 (e.g., a previous trip by a user from home to an ice cream shop), a second route 420 (e.g., a previous trip by the user from work to a baseball stadium), a third route 422 (e.g., a previous trip by the user from a soccer field to a store), a fourth route 424 (e.g., a previous trip by the user from home to a park), fifth route 426 (e.g., a previous trip by the user from a hotel to a beach), and/or other previously traveled routes by the user.

The user preference weight generator 406 may utilize weighted travel metrics (e.g., a set of weighting values applied to a travel metrics, such as a weighting value of 4.2 applied to a highway travel metric) to generate a first set of computed routes 412, such as a first computed route 428 between home and the ice cream shop, a second computed route 430 between work and the baseball stadium, a third computed route 432 between the soccer field and the store, a fourth computed route 434 between home and the park, a fifth computed route 436 between the hotel and the beach, and/or other computed routes traveled by the user between starting locations and destination locations. The weighted travel metrics may be modified (e.g., one or more weighting values within the weighted travel metrics may be modified, such as a change from the weighting value of 4.2 to a new weighting value of 2.8 for the highway travel metric) and used to create first modified weighted travel metrics for a first set of modified computed routes 414, such as a first modified computed route 438 between home and the ice cream shop, a second modified computed route 440 between work and the baseball stadium, a third modified computed route 442 between the soccer field and the store, a fourth modified computed route 444 between home and the park, a fifth modified computed route 446 between the hotel and the beach, and/or other modified computed routes traveled by the user between starting locations and destination locations. In this way, a plurality of computed routes, such as modified computed routes derived from different weighting values, may be generated.

The user preference weight generator 406 may compare the computed routes, within the first set of computed routes 412, to corresponding traveled routes within the set of actual traveled routes 410 to determine a similarity between the first set of computed routes 412 and the set of actual traveled routes 410 (e.g., a 20% similarity metric). The user preference weight generator 406 may compare the modified computed routes, within the first modified set of computed routes 414, to corresponding traveled routes within the set of actual traveled routes 410 to determine a similarity between the first modified set of computed routes 414 and the set of actual traveled routes 410 (e.g., a 60% similarity metric). The user preference weight generator 406 may compare other computed routes to corresponding traveled routes within the set of actual traveled routes 410 to determine similarities between computed routes and the set of actual traveled routes 410 (e.g., a 90% similarity metric may be assigned to an Nth set of modified computed routes 416). A computed route, such as within the Nth set of modified computed routes 416, may be identified as a target computed route based upon the computed route having a similarity metric above a threshold (e.g., the 90% similarly metric may be greater than similarity metrics of other computed routes, and thus the Nth set of modified computed routes 416 may comprise one or more computed routes most similar to the set of actual traveled routes 410). Target weighted travel metrics, associated with the target computed route, may be used to generate and/or maintain user preference weighted travel metrics that may be used to control a travel route planning module to generate new travel routes similar to driving preferences and/or behaviors of the user. The user preference weighted travel metrics may be maintained, for example, by being updated based upon target weighted travel metrics derived from other traveled routes of the user.

Figure 5:
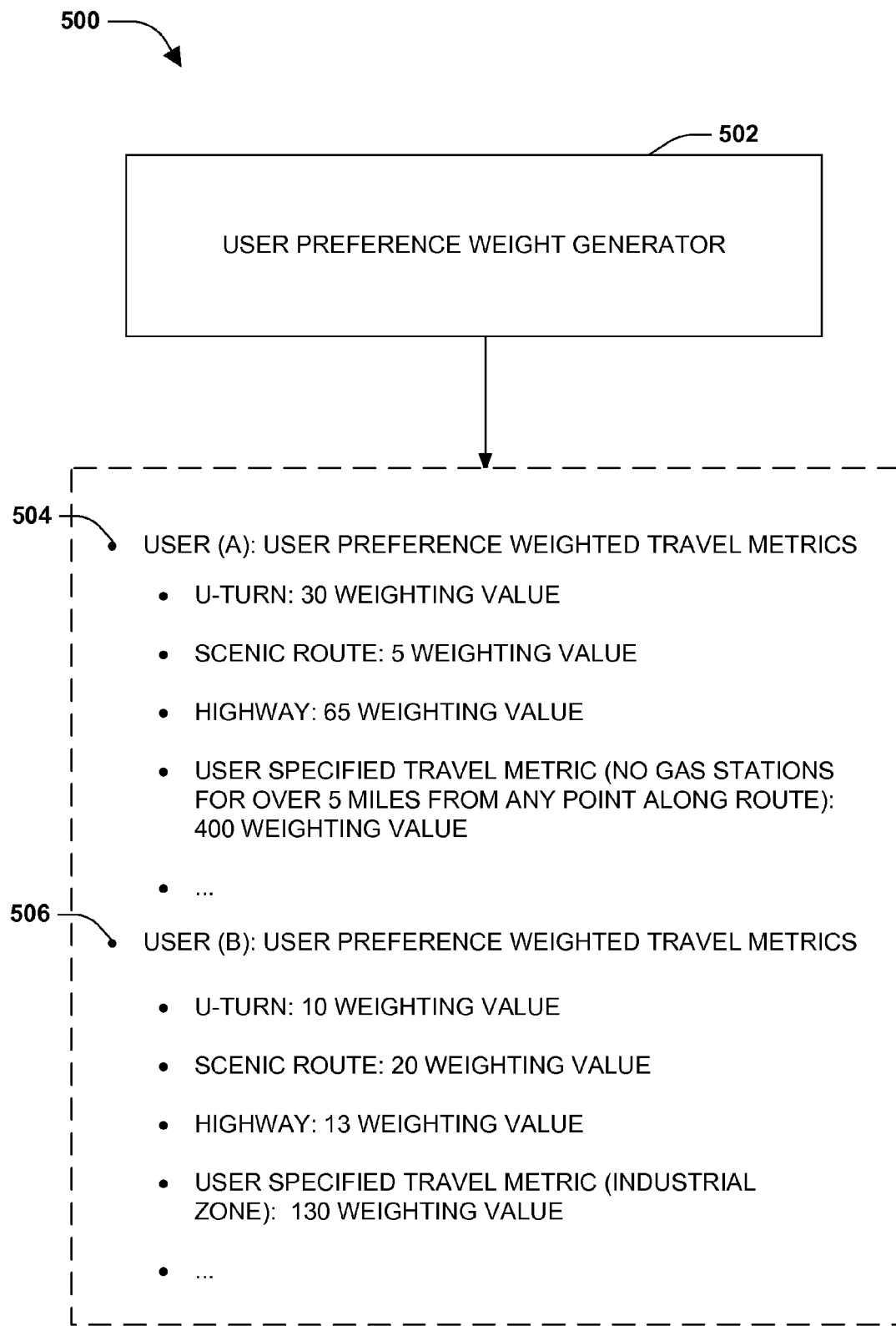
FIG. 5 is a component block diagram illustrating an exemplary system for controlling a travel route planning module associated with a user device, where different user preference weighted travel metrics are generated for different users.

FIG. 5 illustrates an example of a system 500 for generating user preference weighted travel metrics used to control a travel route planning module associated with a user device (e.g., a travel route planning module 608 of FIG. 6). The system 500 comprises a user preference weight generator 502. The user preference weight generator 502 may have evaluated travel related data, for a user and regarding traveled routes traveled by the user, utilizing a machine learning technique (e.g., a coordinate decent machine learning technique) used to generate and evaluate computed routes having different weighted travel metrics.

In an example, the user preference weight generator 502 may have generated user (A) preference weighted travel metrics 504 for a user (A). The user (A) preference weighted travel metrics 504 may comprise a weighting value of 30 applied to a U-turn travel metric, a weighting value of 5 applied to a scenic route travel metric, a weighting value of 65 applied to a highway travel metric, a weighting value of 400 applied to a user specified travel metric (e.g., the user (A) may have specified the user specified travel metric as corresponding to a lack gas stations within 5 miles from any point along a route), etc. In an example, the user preference weight generator 502 may have generated user (B) preference weighted travel metrics 506 for a user (B). The user (B) preference weighted travel metrics 506 may comprise a weighting value of 10 applied to the U-turn travel metric, a weighting value of 20 applied to the scenic route travel metric, a weighting value of 13 applied to the highway travel metric, a weighting value of 130 applied to a user specified travel metric (e.g., the user (B) may have specified the user specified travel metric as corresponding to an industrial zone), etc. In this way, user preference weighted travel metrics may be personalized for various users based upon driving preferences and/or habits inferred from previously traveled routes by users.

FIG. 6 illustrates an example of a system 600 for controlling a travel route planning module 608 associated with a user device 610. The system 600 may comprise a user preference weight generator 602 and/or a travel route coordinator 606. In an example, at least some of the user preference weight generator 602, the travel route coordinator 606, and/or the travel route planning module 608 may be hosted within the user device 610 (e.g., a vehicle navigation system, a smart phone, etc.). In an example, at least some of the user preference weight generator 602, the travel route coordinator 606, and/or the travel route planning module 608 may be hosted within a device that is remote to the user device 610 (e.g., a cloud server hosting a mapping service configured to provide travel directions to the user device 610). In an example, the user device 610 may comprise a vehicle computing device integrated into a vehicle. The travel route coordinator 606 may be hosted within the vehicle computing device (e.g., a vehicle navigation system). Because multiple users may utilize and/or access the vehicle, the travel route coordinator 606 may implement a user privacy setting 618 for controlling the travel route planning module 608 hosted within the vehicle computing device (e.g., a user may be required to login into a user account in order to obtain travel routes that are customized for the particular user). In another example, the travel route coordinator 606 may be hosted within a cloud server having a communication connection with the user device. In another example, the travel route coordinator 606 may be hosted within a mobile computed device.

The user preference weight generator 602 may be configured to generate user preference weighted travel metrics 604 corresponding to travel preferences and/or habits of a user, which may be derived from previously traveled routes of the user. For example, the user preference weight generator 602 may be configured to iteratively adjust weighting values to generate a plurality of modified computed routes having different modified weighted travel metrics that comprise weighting values that are applied to travel metrics and/or user specified travel metrics (e.g., the user may have specified an industrial zone travel metric through a submission interface 614). The plurality of modified computed routes may be evaluated against traveled routes, traveled by the user, to identify a target computed route having a similarity with the traveled routes above a threshold (e.g., a computed route that is more similar to the traveled routes than other computed routes are to the traveled routes). The user preference weighted travel metrics 604 may be generated based upon target weighted travel metrics associated with the target computed route.

The travel route coordinator 606 may be configured to control the travel route planning module 608 based upon the user preference weighted travel metrics 604. For example, the travel route coordinator 606 may control the travel route planning module 608 to generate a travel route 612 utilizing the user preference weighted travel metrics 604. Because the travel route 612 is generated utilizing the user preference weighted travel metrics 604, the travel route 612 may match driving preferences and/or habits of the user as compared to travel routes generated utilizing default weighted travel metrics. The user preference weight generator 602 may be configured to provide the user with travel preference feedback 616 (e.g., suggested trips, route choice improvements to reduce travel time or for more scenic routes, etc.)

According to an aspect of the instant disclosure, a system for controlling a travel route planning module associated with a user device is provided. The system comprises a user preference weight generator and a travel route coordinator. The user preference weight generator is configured to access travel related data, for a user, regarding a traveled route traveled by the user from a starting location to a destination location. The travel related data comprises travel metrics for the traveled route. The user preference weight generator is configured to apply a set of weighting values to the travel metrics to generate a computed route having weighted travel metrics. The user preference weight generator is configured to apply a modified set of weighting values to the travel metrics to generate a modified computed route having modified weighted travel metrics. The user preference weight generator is configured to generate user preference weighted travel metrics using the modified weighted travel metrics based upon first similarity information between the computed route and the traveled route being less than second similarity information between the modified computed route and the traveled route, otherwise, generate the user preference weighted travel metrics using the weighted travel metrics. The travel route coordinator is configured to control a travel route planning module associated with a user device of the user to generate a travel route utilizing the user preference weighted travel metrics.

According to an aspect of the instant disclosure, a method for controlling a travel route planning module associated with a user device is provided. The method includes accessing travel related data, for a user, regarding a traveled route traveled by the user from a starting location to a destination location. The travel related data comprises travel metrics for the traveled route. The method includes applying a set of weighting values to the travel metrics to generate a computed route having weighted travel metrics. The method includes generating a modified set of weighting values by applying a plurality of weighting value modifications to a plurality of weighting values within the set of weighting values. The method includes applying the modified set of weighting values to the travel metrics to generate a modified computed route having modified weighted travel metrics. The method includes generating user preference weighted travel metrics using the modified weighted travel metrics based upon first similarity information between the computed route and the traveled route being less than second similarity information between the modified computed route and the traveled route, otherwise, generating the user preference weighted travel metrics using the weighted travel metrics. The method includes controlling a travel route planning module associated with a user device of the user to generate a travel route utilizing the user preference weighted travel metrics.

According to an aspect of the instant disclosure, a system for controlling a travel route planning module associated with a user device is provided. The system comprises a user preference weight generator and a travel route coordinator. The user preference weight generator is configured to access travel related data, for a user, regarding one or more traveled routes traveled by the user. For respective traveled routes of the one or more traveled routes, a traveled route from a starting location to a destination location is identified. The travel related data comprises travel metrics for the traveled route. Weighting values within a set of weighting values are iteratively adjusted to generate a plurality of modified computed routes having different modified weighted travel metrics. The plurality of modified computed routes is evaluated against the traveled route to identify a target computed route having a similarity with the traveled route above a threshold. User preference weighted travel metrics are maintained based upon target weighted travel metrics associated with the target computed route. The travel route coordinator is configured to control a travel route planning module associated with a user device of the user to generate a travel route utilizing the user preference weighted travel metrics.

According to an aspect of the instant disclosure, a means for controlling a travel route planning module associated with a user device is provided. Travel related data, for a user and regarding a traveled route traveled by the user from a starting location to a destination location, is accessed, by the means for controlling a route planning module. The travel related data comprises travel metrics for the traveled route. A set of weighting values is applied to the travel metrics to generate a computed route having weighted travel metrics, by the means for controlling a route planning module. A modified set of weighting values is applied to the travel metrics to generate a modified computed route having modified weighted travel metrics, by the means for controlling a route planning module. User preference weighted travel metrics are generated using the modified weighted travel metrics based upon first similarity information between the computed route and the traveled route being less than second similarity information between the modified computed route and the traveled route, otherwise, the user preference weighted travel metrics are generated using the weighted travel metrics, by the means for controlling a route planning module. A travel route planning module, associated with a user device of the user, is controlled to generate a travel route utilizing the user preference weighted travel metrics, by the means for controlling a travel route planning module.

According to an aspect of the instant disclosure, a means for controlling a travel route planning module associated with a user device is provided. Travel related data, for a user and regarding a traveled route traveled by the user from a starting location to a destination location, is accessed, by the means for controlling a route planning module. The travel related data comprises travel metrics for the traveled route. A set of weighting values is applied to the travel metrics to generate a computed route having weighted travel metrics, by the means for controlling a route planning module. A modified set of weighting values is generated by applying a plurality of weighting value modifications to a plurality of weighting values within the set of weighting values, by the means for controlling a route planning module. The modified set of weighting values is applied to the travel metrics to generate a modified computed route having modified weighted travel metrics, by the means for controlling a route planning module. User preference weighted travel metrics are generated using the modified weighted travel metrics based upon first similarity information between the computed route and the traveled route being less than second similarity information between the modified computed route and the traveled route, otherwise, the user preference weighted travel metrics are generated using the weighted travel metrics, by the means for controlling a route planning module. A travel route planning module, associated with a user device of the user, is controlled to generate a travel route utilizing the user preference weighted travel metrics, by the means for controlling a route planning module.

According to an aspect of the instant disclosure, a means for controlling a travel route planning module associated with a user device is provided. Travel related data, for a user and regarding one or more traveled routes traveled by the user, is accessed, by the means for controlling a route planning module. For respective traveled routes of the one or more traveled routes, a traveled route from a starting location to a destination location is identified, by the means for controlling a route planning module. The travel related data comprises travel metrics for the traveled route. Weighting values, within a set of weighting values, are iteratively adjusted to generate a plurality of modified computed routes having different modified weighted travel metrics, by the means for controlling a route planning module. The plurality of modified computed routes are evaluated against the travel route to identify a target computed route having a similarity with the travel route above a threshold, by the means for controlling a route planning module. User preference weighted travel metrics are maintained based upon target weighted travel metrics associated with the target computed route, by the means for controlling a route planning module. A travel route planning module, associated with a user device of the user, is controlled to generate a travel route utilizing the user preference weighted travel metrics, by the means for controlling a route planning module.

Figure 7:
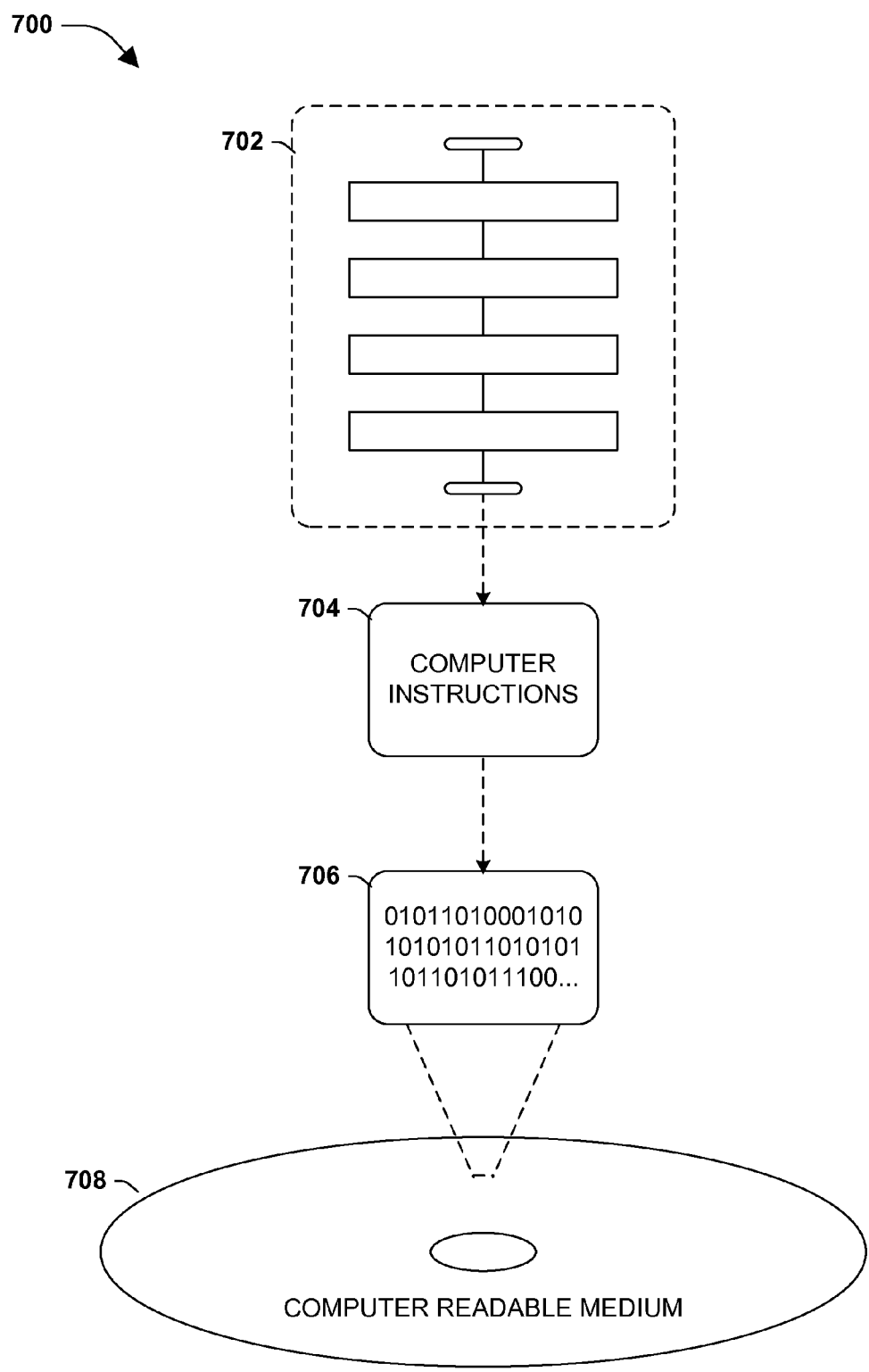
FIG. 7 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 7, wherein the implementation 700 comprises a computer-readable medium 708, such as a CD-R, DVD-R, flash drive, a platter of a hard disk drive, etc., on which is encoded computer-readable data 706. This computer-readable data 706, such as binary data comprising at least one of a zero or a one, in turn comprises a set of computer instructions 704 configured to operate according to one or more of the principles set forth herein. In some embodiments, the set of computer instructions 704 are configured to perform a method 702, such as at least some of the exemplary method 100 of FIG. 1 and/or at least some of the exemplary method 300 of FIG. 3, for example. In some embodiments, the set of computer instructions 704 are configured to implement a system, such as at least some of the exemplary system 200 of FIG. 2, at least some of the exemplary system 400 of FIG. 4, at least some of the exemplary system 500 of FIG. 5, and/or at least some of the exemplary system 600 of FIG. 6, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
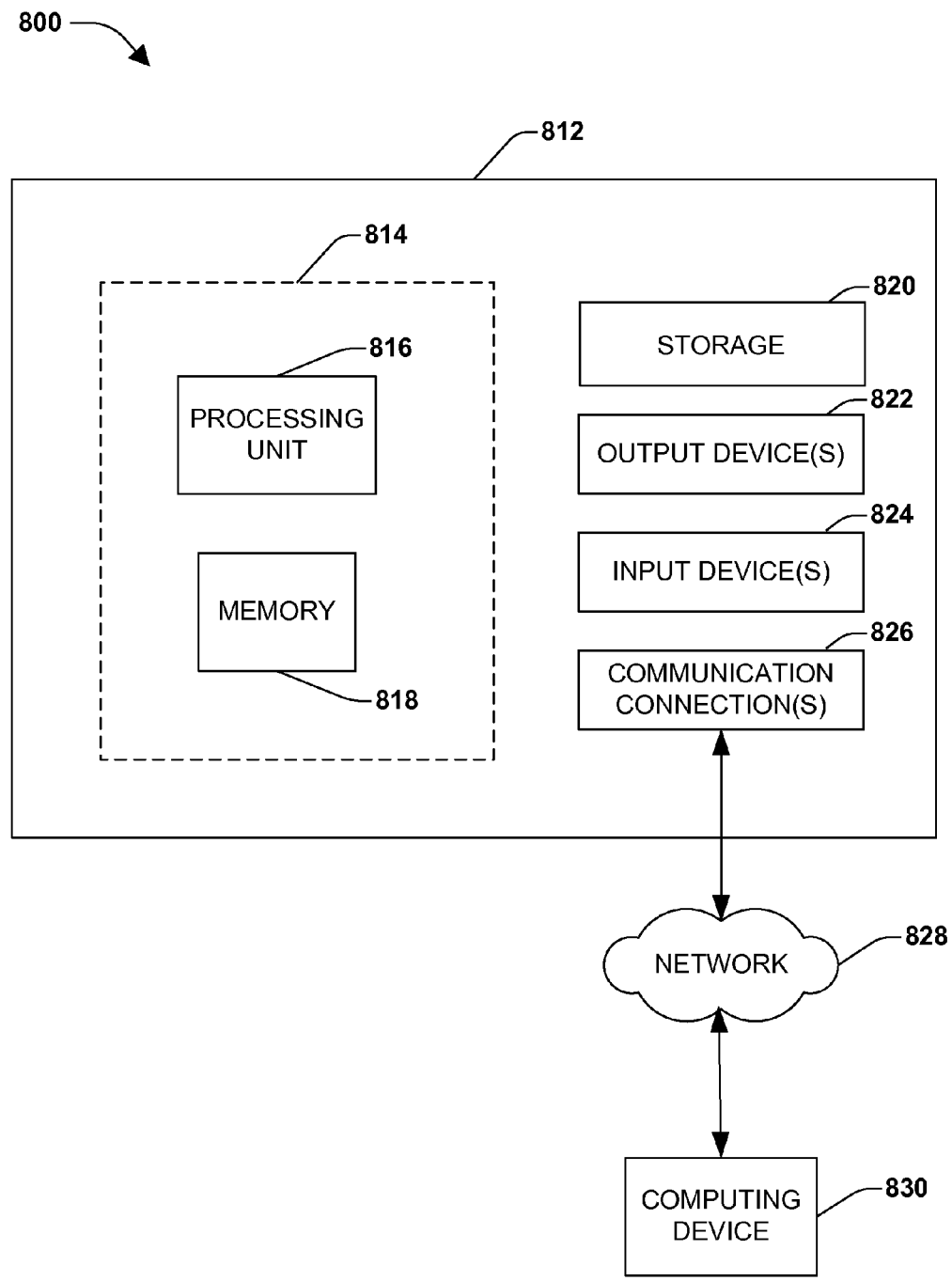
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), tablets, smart devices, wearables (e.g., watches, glasses, etc.) media players, and the like), multi-processor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Computer storage media does not, however, include propagated signals. Rather, computer storage media excludes propagated signals. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system comprising:
one or more processing units; and
memory comprising instructions, that when executed by at least one of the one or more processing units, implement:
a user preference weight generator configured to:
access travel related data, for a user, regarding a traveled route traveled by the user from a starting location to a destination location, the travel related data comprising travel metrics for the traveled route;
apply a set of weighting values to the travel metrics to generate a computed route having weighted travel metrics, the set of weighting values comprising initial or default values for the travel metrics;
apply a modified set of weighting values to the travel metrics to generate a modified computed route having modified weighted travel metrics; and
in an instance when the modified computed route is relatively more similar to the traveled route than the computed route, generate user preference weighted travel metrics using the modified weighted travel metrics; and
a travel route coordinator configured to:
control a travel route planning module associated with a user device of the user to generate another travel route utilizing the user preference weighted travel metrics.

2. The system of claim 1, the user preference weight generator configured to:
generate the modified set of weighting values by applying a plurality of weighting value modifications in parallel to a plurality of weighting values within the set of weighting values.

3. The system of claim 1, the travel route coordinator configured to:
implement a user privacy setting for controlling the travel route planning module.

4. The system of claim 1, the travel route coordinator hosted within a vehicle navigation system.

5. The system of claim 1, the user device comprising a mobile computing device, the travel route coordinator hosted within the mobile computing device.

6. The system of claim 1, the user preference weight generator configured to:
iteratively adjust the weighting values within the set of weighting values to generate a plurality of modified computed routes having different modified weighted travel metrics;
evaluate the plurality of modified computed routes against the traveled route to identify a target computed route having a similarity with the traveled route above a threshold; and
generate the user preference weighted travel metrics based at least upon target weighted travel metrics associated with the target computed route.

7. A method comprising:
accessing travel related data, for a user, regarding a traveled route traveled by the user from a starting location to a destination location, the travel related data comprising travel metrics for the traveled route;
applying a set of weighting values to the travel metrics to generate a computed route having weighted travel metrics;
generating a modified set of weighting values by applying a plurality of weighting value modifications to a plurality of weighting values within the set of weighting values;
applying the modified set of weighting values to the travel metrics to generate a modified computed route having modified weighted travel metrics;
in an instance when the modified computed route is relatively more similar to the traveled route than the computed route, generating user preference weighted travel metrics using the modified weighted travel metrics; and
controlling a travel route planning module associated with a user device of the user to generate another travel route utilizing the user preference weighted travel metrics.

8. The method of claim 7, the accessing comprising:
accessing a travel route data storage structure populated with the travel related data from a GPS sensor.

9. The method of claim 7, comprising:
in another instance when the computed route is relatively more similar to the traveled route than the modified computed route, generating the user preference weighted travel metrics using the weighted travel metrics of the computed route.

10. The method of claim 7, comprising:
comparing distances between points on the computed route and the modified computed route to other points on the traveled route using a threshold; and
based on the comparing, determining relative similarities of the computed route and the modified computed route to the traveled route.

11. The method of claim 7, comprising:
accessing a user specified travel metric; and
including the user specified travel metric within the travel metrics.

12. The method of claim 7, the applying a set of weighting values to the travel metrics to generate a computed route comprising:
identifying a second user based at least upon the second user having a second user profile similar to a user profile of the user;
accessing second user preference weighted travel metrics associated with the second user; and
utilizing the second user preference weighted travel metrics as seed data for generating the set of weighting values.

13. The method of claim 7, the generating user preference weighted travel metrics comprising:
utilizing a coordinate decent machine learning technique to evaluate the travel related data for generating the user preference weighted travel metrics.

14. The method of claim 7, the user preference weighted travel metrics comprising an individual weighting value corresponding to a cost associated with an individual travel metric.

15. The method of claim 7, comprising:
identifying a user travel preference of the user based at least upon the user preference weighted travel metrics; and
providing travel preference feedback to the user based at least upon the user travel preference.

16. The method of claim 7, comprising:
updating the user preference weighted travel metrics based at least upon updated travel related data.

17. The method of claim 7, the generating a modified set of weighting values comprising:

generating the modified set of weighting values by applying a weighting value increase to an individual weighting value within the set of weighting values.

18. The method of claim 7, the generating a modified set of weighting values comprising:
generating the modified set of weighting values by applying a weighting value decrease to an individual weighting value within the set of weighting values.

19. The method of claim 7, the generating a modified set of weighting values comprising:
applying the plurality of weighting value modifications in parallel to the plurality of weighting values within the set of weighting values.

20. A system comprising:
one or more processing units; and
memory comprising instructions that, when executed by at least one of the one or more processing units, cause the at least one of the one or more processing units to:
access travel related data, for a user, regarding one or more traveled routes traveled by the user;
for respective traveled routes of the one or more traveled routes:
identify an individual travelled route from a starting location to a destination location, the travel related data comprising travel metrics for the individual traveled route;
iteratively adjust weighting values within a set of weighting values to generate a plurality of modified computed routes having different modified weighted travel metrics;
evaluate the plurality of modified computed routes against the individual traveled route to identify a target computed route having a similarity with the traveled route above a threshold; and
maintain user preference weighted travel metrics based at least upon target weighted travel metrics associated with the target computed route; and
control a travel route planning module associated with a user device of the user to generate another travel route utilizing the user preference weighted travel metrics.

* * * * *